(12) United States Patent
Marchini et al.

(10) Patent No.: US 10,201,945 B2
(45) Date of Patent: Feb. 12, 2019

(54) PROCESS AND PLANT FOR MANUFACTURING MUTUALLY DIFFERENT TYRES

(71) Applicant: PIRELLI TYRE S.P.A., Milan (IT)

(72) Inventors: Maurizio Marchini, Milan (IT); Michele Ballabio, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 0 days.

(21) Appl. No.: 14/356,006

(22) PCT Filed: Oct. 30, 2012

(86) PCT No.: PCT/IB2012/055995
§ 371 (c)(1),
(2) Date: May 2, 2014

(87) PCT Pub. No.: WO2013/068880
PCT Pub. Date: May 16, 2013

(65) Prior Publication Data
US 2014/0311655 A1 Oct. 23, 2014

Related U.S. Application Data

(60) Provisional application No. 61/564,796, filed on Nov. 29, 2011.

(30) Foreign Application Priority Data

Nov. 10, 2011 (IT) .......................... MI2011A002039

(51) Int. Cl.
*B29D 30/30* (2006.01)
*B29D 30/00* (2006.01)

(52) U.S. Cl.
CPC .......... *B29D 30/30* (2013.01); *B29D 30/005* (2013.01); *B29D 30/305* (2013.01);
(Continued)

(58) Field of Classification Search
CPC .............. B29D 30/165; B29D 30/1657; B29D 30/305; B29D 30/3057; B29D 2030/1678; B29D 2030/3078
(Continued)

(56) References Cited

U.S. PATENT DOCUMENTS 1,876,375 A * 9/1932 Wikle .................... B29D 30/50
156/136
3,570,573 A * 3/1971 Marker et al. ................ 152/458
(Continued)

FOREIGN PATENT DOCUMENTS

EP 1 481 791 12/2004
JP 57-105336 * 6/1982 ............. B29H 17/20
(Continued)

OTHER PUBLICATIONS

Machine generated English language translation of JP 57-105336 (original document dated Jun. 1982).*
(Continued)

*Primary Examiner* — Martin K Rogers
(74) *Attorney, Agent, or Firm* — Finnegan, Henderson, Farabow, Garrett & Dunner, L.L.P.

(57) ABSTRACT

Production of carcass structures and/or production of crown structures includes: positioning a first continuous elongated element so that its end stretch is aligned with a cutting position; positioning a second continuous elongated element so that its end stretch is in side by side relationship with the end stretch of the first continuous elongated element; forming first strip-like elements from the first continuous elongated element; depositing the first strip-like elements on at least one forming drum; translating the end stretches of the first and second continuous elongated element in a transverse direction relative to their longitudinal extension to align the end stretch of the second continuous elongated
(Continued)

element to said cutting position; forming second strip-like elements from the second continuous elongated element; and depositing the second strip-like elements on said at least one forming drum.

11 Claims, 4 Drawing Sheets

(52) U.S. Cl.
CPC ..... *B29D 30/3042* (2013.01); *B29D 30/3057* (2013.01); *B29D 2030/3085* (2013.01)

(58) Field of Classification Search
USPC ............... 156/117, 133, 397, 406, 406.4
See application file for complete search history.

(56) References Cited

U.S. PATENT DOCUMENTS

| | | | | |
|---|---|---|---|---|
| 3,795,563 | A | * | 3/1974 | Enders ..................... 156/406 |
| 4,218,004 | A | * | 8/1980 | Rouse ..................... 226/149 |
| 4,431,126 | A | * | 2/1984 | Jones ..................... 226/121 |
| 4,489,873 | A | * | 12/1984 | Yoshida ............. A44B 19/60 156/519 |
| 4,838,137 | A | * | 6/1989 | Azuma ..................... 83/42 |
| 4,874,443 | A | * | 10/1989 | Kipling ..................... 156/64 |
| 4,892,609 | A | | 1/1990 | Nakanome et al. |
| 5,341,996 | A | * | 8/1994 | Rutherford, Sr. ............ 241/69 |
| 5,554,242 | A | * | 9/1996 | Brown et al. .............. 156/111 |
| 5,735,995 | A | * | 4/1998 | Bull et al. ................ 156/398 |
| 2003/0070742 | A1 | * | 4/2003 | Risser ............... B29D 30/58 156/130 |
| 2004/0079487 | A1 | * | 4/2004 | Marchini et al. ........... 156/397 |
| 2004/0238102 | A1 | | 12/2004 | Girard et al. |
| 2005/0076988 | A1 | * | 4/2005 | Noto et al. ................ 152/526 |
| 2006/0011285 | A1 | * | 1/2006 | Suda ...................... 156/117 |
| 2006/0219348 | A1 | | 10/2006 | Girard et al. |
| 2009/0301638 | A1 | * | 12/2009 | Marchini et al. ........... 156/117 |
| 2010/0193136 | A1 | * | 8/2010 | Grolleman .................. 156/396 |
| 2010/0294099 | A1 | * | 11/2010 | Van Laar et al. ............. 83/72 |
| 2012/0255666 | A1 | | 10/2012 | Mancini |
| 2012/0255667 | A1 | | 10/2012 | Marchini et al. |
| 2013/0000824 | A1 | * | 1/2013 | Put et al. ................. 156/117 |

FOREIGN PATENT DOCUMENTS

| | | | |
|---|---|---|---|
| RU | 2213009 | 9/2003 | |
| SU | 1431666 | 10/1988 | |
| WO | WO 2005/055695 | * 5/2007 | ............ B29D 30/20 |
| WO | WO 2007/055695 | 5/2007 | |
| WO | WO 2011/045688 | 4/2011 | |
| WO | WO 2011/077236 | 6/2011 | |

OTHER PUBLICATIONS

International Search Report from the European Patent Office for International Application No. PCT/IB2012/055995, dated Feb. 12. 2013.
Written Opinion of the International Searching Authority from the European Patent Office for International Application No. PCT/IB2012/055995, dated Feb. 12, 2013.
Official Decision of Grant from the Russian Federation dated Nov. 1, 2016.
English Translation of the Official Decision of Grant from the Russian Federation dated Nov. 1, 2016.

* cited by examiner

PROCESS AND PLANT FOR MANUFACTURING MUTUALLY DIFFERENT TYRES

CROSS REFERENCE TO RELATED APPLICATIONS

This application is a national phase application based on PCT/IB2012/055995, filed Oct. 30, 2012, which claims the priority of Italian Patent Application No. MI2011A002039, filed Nov. 10, 2011, and the benefit of U.S. Provisional Application No. 61/564,796, filed Nov. 29, 2011, the content of each application being incorporated herein by reference.

BACKGROUND OF THE INVENTION

Field of the Invention

The present invention aims at providing a process and a plant for budding tyres different from each other.

Description of the Related Art

The building of a tyre usually provides for producing a carcass structure comprising at least one carcass ply associated with a pair of annular anchoring structures, the production of a crown structure comprising at least one belt structure (and preferably also a tread band) and the assembly of the crown structure on the carcass structure.

In the context of the present description and in the subsequent claims, the expression "elastomeric material", is used to indicate a composition comprising at least one elastomeric polymer and at least one reinforcement filler. Preferably, such composition further comprises additives such as cross-linking and/or plasticization agents. Due to the presence of the cross-linking agents, such material may be cross-linked by means of heating, so as to form the end product.

In the present description and in the subsequent claims the expression "continuous elongated element" is used to indicate an elongated element made of elastomeric material comprising a plurality of reinforcing cords.

Preferably said reinforcing cords are parallel to each other. Preferably said reinforcing cords are fabric or metallic. Preferably said reinforcing cords extend in the longitudinal direction of the same continuous elongated element.

In the present description and in the subsequent claims the expression "strip-like element" is used to indicate an elementary semi-finished product of elongated configuration, comprising one or more reinforcing cords coupled to an elastomeric material matrix, obtained by cutting the aforementioned continuous elongated element to size. Generally, such strip-like elements are disposed in a mutually approaching relationship, particularly in cases of strip-like elements which cooperate for example to form the carcass plies, belt layers and some types of reinforcement.

U.S. Pat. No. 4,892,609 describes the use of an automatic feeding device in which two different semi-finished products in the form of a continuous strip are fed by respective reels through the first feeders provided with a respective automatic cutting apparatus and a centring apparatus. A second feeder disposed downstream of the first feeders receives pieces of semi-finished products from one of the first feeders, and provides for advancing said pieces to determine the winding around a building drum driven in rotation. The second feeder is moveable to be selectively connected respectively with the one or the other of the first feeders, depending on the type of semi-finished product to be used.

WO 2011/077236 on behalf of the Applicant illustrates a plant and a process for building different types of green tyres for vehicle wheels for each tyre size, by using elementary semi-finished products, the process comprising:

a) building a carcass structure; b) building a crown structure; in which at least one from among the building of the carcass structure and building the crown structure comprises: c) providing at least one first unit for feeding a first elementary semi-finished product and a second unit for feeding a second elementary semi-finished product, said at least one first and a second elementary semi-finished product being different from each other; d) building at least one portion of a structural component of the tyre being processed starting from at least one of said first and second elementary semi-finished products, in a work station fed by said first and second units for feeding said first and second elementary semi-finished products.

The Applicant observed that the possibility of selecting and modifying the length and the cutting angle of the strip-like elements from time to time offers an appreciated flexibility in plants like those illustrated in WO 2011/077236 with the aim of producing tyres different from each other, in terms of size and/or structural composition, also when there is required the diversified production in small batches.

The Applicant however observed that there may be required a differentiation of the strip-like elements not only in terms of length and cutting angle, but also in structural terms, for example regarding the number and type of reinforcing cords and/or the composition of the elastomeric material covering the cords.

The Applicant actually deems it advantageous to differentiate the production of the tyres and/or the single components of the same tyre along the building line, depending on the type of continuous elongated element used for manufacturing the strip-like elements used for building the carcass structures and/or the crown structures.

Regarding this, the Applicant observed that in the context of the aforementioned production processes aimed at attaining high production flexibility, there should be avoided the production of scraps when replacing the continuous elongated element used for producing the tyres. Actually, the production of scraps, even of marginal amount, could lead to high wastage of material and ensuing complication as regards the management, processing and disposal of the same, following frequent and repeated replacement of the elongated element used for building tyres.

Furthermore, the Applicant observed that in the production contexts like those illustrated in WO 2011/077236 the replacement of the continuous elongated element used for manufacturing strip-like elements for building tyres may occur simultaneously with operations of setting up the equipment predisposed on the building line to adapt the same to the processing of tyres different from those built previously.

Therefore, the Applicant perceived the possibility of replacing the type of continuous elongated element without leading to any additional downtime, if such replacement takes place within short periods of time, not exceeding those normally required by the aforementioned set-up times.

Lastly, the Applicant found that predisposing, along a carcass-structure building line and/or along a crown-structure building line, at least one cutting and deposition station served by a station for setting up elementary semi-finished products provided with at least one first and one second distinct loading units, simultaneously moveable to be individually and selectively used as a function of the type of continuous elongated element to be used, allows performing—instantly and totally in absence of waste of material—frequent replacement of the same continuous elongated element.

More in particular, according to a first aspect, the present invention regards a process for building tyres comprising: manufacturing carcass structures; manufacturing crown structures; assembling each carcass structure to one of said crown structures; wherein at least one of said actions for manufacturing carcass structures and manufacturing crown structures comprises: positioning a first continuous elongated element so that its end stretch is aligned with a cutting position; positioning a second continuous elongated element so that its end stretch is in side by side relationship with the end stretch of the first continuous elongated element; forming first strip-like elements from said first continuous elongated element; depositing said first strip-like elements on a first forming drum; translating the end stretches of the first continuous elongated element and the end stretches of the second continuous elongated element in a transverse direction relative to the their longitudinal extension to align the end stretch of the second continuous elongated element to said cutting position; forming second strip-like elements from said second continuous elongated element; depositing said second strip-like elements on a second forming drum.

The Applicant deems that the availability of two or more continuous elongated elements different from each other, which can be used separately and immediately replaceable one with the other depending on the needs at the cutting position, allows frequently differentiating—and without waste of material—the type of elementary semi-finished products used with the aim of producing the carcass structure and/or the crown structure, particularly in terms of closeness, physical, geometric and structural characteristics of the cords, and/or in terms of the physical/chemical characteristics of the elastomeric material associated thereto.

The replacement of the type of continuous elongated element is also suitable to be carried out almost instantaneously, so as not to increase the production downtimes required by the normal equipment set-up operations.

According to a further aspect, the invention regards a plant for building tyres for vehicle wheels, comprising: a carcass-structure building line; a crown-structure building line; an assembling station for coupling each carcass structure to one of said crown structures; in which at least one of said carcass-structure building line and crown-structure building line comprises: devices for feeding at least one first continuous elongated element and one second continuous elongated element; a first loading unit for positioning the first continuous elongated element so that its end stretch is aligned with a cutting position; a second loading unit for positioning the second continuous elongated element so that its end stretch is disposed in side by side relationship with the end stretch of the first continuous elongated element; a selection unit for individually and selectively aligning the end stretch of the first continuous elongated element and the end stretch of the second continuous elongated element with said cutting position; a separation unit operating in the cutting position for forming first strip-like elements and second strip-like elements respectively from said first continuous elongated element and second continuous elongated element; deposition devices for depositing said first strip-like elements and second strip-like elements on a first forming drum and a second forming drum respectively.

The present invention, according to at least one of the aforementioned aspects, may have one or more of the preferred characteristics described hereinafter.

Said first strip-like elements and/or said second strip-like elements are preferably distributed in mutually approached relationship along a circumferential direction of said first forming drum and second forming drum.

Preferably, a first tyre being processed on said first forming drum is at least partly formed during said action of depositing said first strip-like elements, and a second tyre being processed on said second forming drum is at least partly formed during said action of depositing said second strip-like elements.

Alternatively a tyre being processed is at least partly formed during said action of depositing said first strip-like elements, on said first forming drum and said second strip-like elements on said second forming drum, said first forming drum coinciding with said second forming drum.

The invention is thus suitable to be used in production contexts requiring extreme flexibility relative to the production of small batches, even made of one or few units, of tyres different from each other in terms of geometric and dimensional characteristics as well as in terms of physical and structural characteristics (for example the type of elastomeric material and/or cords used) of the elementary semi-finished products used for manufacturing the tyre itself.

Preferably an elastomeric layer used in preparing the first continuous elongated element is manufactured using an elastomeric material different from that used for manufacturing a corresponding elastomeric layer used in preparing the second continuous elongated element.

It is thus possible to diversify the production as a function of the type of compound required by the project specifications for the elastomeric material embedding reinforcing cords.

In preparing the first continuous elongated element, reinforcing cords different from the reinforcing cords used for manufacturing the second continuous elongated element are preferably used.

It is thus possible to diversify the production of tyres, and/or the components thereof, as a function of the type of reinforcing cords required by the product specification for the production of the carcass structure and/or the crown structure.

Said translating action is carried out simultaneously on the end stretch of the first continuous elongated element and on the end stretch of the second continuous elongated element.

This allows reducing the time required for replacing the continuous elongated element used in the production of the tyres.

Said translating action is carried out in a direction perpendicular to the longitudinal extension of the end stretch of the first continuous elongated element and of the end stretch of the second continuous elongated element.

The removal of a continuous elongated element from the cutting position can thus be obtained simultaneously with the positioning of the other continuous elongated element in the cutting position.

The end stretch of the first continuous elongated element is moved backward away longitudinally from the cutting position before said translating action.

This allows avoiding possible interferences between the end stretch of the continuous elongated element and parts of the cutting member or other fixed parts.

The action of depositing each first strip-like element and second strip-like element precedes the formation of each first strip-like element or subsequent second strip-like element.

This allows avoiding the need of stocking one or more strip-like elements before the deposition thereof.

SUMMARY OF THE INVENTION

The action of depositing each first strip-like element and second strip-like element is followed by a rotation of the first forming drum, or the second forming drum respectively, according to a predetermined angle around a geometric rotation axis thereof.

The action of manufacturing each of said first strip-like element or second strip-like element comprises: longitudinally laying said first continuous elongated element or second continuous elongated element beyond the cutting position by an extent equal to the length of the first strip-like element or the second strip-like element; cutting the first continuous elongated element or the second continuous elongated element in the cutting position.

It is thus possible to manufacture each strip-like element in an accurate manner.

The action of longitudinally laying said first continuous elongated element or second continuous elongated element comprises: engaging the free end of the end stretch of the first continuous elongated element or the end stretch of the second continuous elongated element by means of a grip element; translating the grip element away from the cutting position for longitudinally advancing the first continuous elongated element or the second continuous elongated element respectively.

Following the translation, each continuous elongated element advantageously has a free stretch extended between the cutting unit and the grip element.

The action of modifying the length of the stroke carried out by the grip element in translating away from the cutting position for setting it according to a selected extent as a function of the length of said first strip-like elements and second strip-like elements to be obtained may be provided for.

The action of adjusting the orientation of a cutting angle according to which said action of cutting said first continuous elongated element or said second continuous elongated element is carried out may be provided for.

The action of longitudinally laying said first continuous elongated element or said second continuous elongated element further comprises: longitudinally pre-advancing the first continuous elongated element or the second continuous elongated element beyond the cutting position, to bring a free end of the end stretch of the first continuous elongated element or the end stretch of the second continuous elongated element respectively, to a grip position.

This allows overcoming the need that the grip element operates through the cutting members to grip the end stretch of the continuous elongated element.

The action of pre-advancing comprises; locking the end stretch of the first continuous elongated element or the end stretch of the second continuous elongated element relative to a separation unit; moving away from the cutting position a carriage slidably engaging the end stretch of the first continuous elongated element or, respectively, the end stretch of the second continuous elongated element; unlocking the end stretch of the first continuous elongated element or the end stretch of the second continuous elongated element respectively, relative to the separation unit; locking the end stretch of the first continuous elongated element or the end stretch of the second continuous elongated element respectively, relative to the carriage; moving the carriage close to the cutting position.

Following the laying action, said first continuous elongated element or said second continuous elongated element is laid at a radially external position relative to said first forming drum or said second forming drum.

The action of depositing each of said first strip-like elements and second strip-like elements is carried out by radially approaching them relative to said first forming drum or said second forming drum.

In the deposition action said first strip-like elements and second strip-like elements are disposed in mutually approached relationship along a circumferential extension direction of said first forming drum or said second forming drum.

In the deposition action said first strip-like elements and second strip-like elements are distributed in a uniform manner over the whole circumferential extension of the first forming drum or of the second forming drum.

The action of setting a deposition angle of the first strip-like elements and of the second strip-like elements according to a desired value, relative to one circumferential extension direction of the first forming drum or the second forming drum may also be provided for.

The deposition angle take place by modifying the mutual orientation between the translation direction of the grip element and a geometric rotation axis of the first forming drum and the second forming drum respectively.

The deposition angle is set by modifying the orientation of a geometric rotation axis of the first forming drum or the second forming drum respectively.

The deposition angle is set by modifying the orientation of the direction of translation of the grip element.

Said deposition devices distribute said first strip-like elements and second strip-like elements in mutually approached relationship along a circumferential direction of said first forming drum or second forming drum.

Preferably at least one of said first loading unit and second loading unit comprises a guide slidably engaging the end stretch of the first continuous elongated element or, respectively, the end stretch of the second continuous elongated element.

Said selection unit comprises: a slide carrying said first loading unit and second loading unit; a selection actuator operating on the slide to selectively position it between a first operating condition at which the first loading unit is operatively aligned with the cutting position and a second operating condition at which the second loading unit is operatively aligned with the cutting position.

Preferably said slide is slidably guided in a direction perpendicular to the longitudinal extension of the end stretch of the first continuous elongated element and of the end stretch of the second continuous elongated element respectively carried by the first loading unit and by the second loading unit.

Preferably said slide is slidably guided parallel to a plane containing the end stretch of the first continuous elongated element and the end stretch of the second continuous elongated element respectively carried by the first loading unit and by the second loading unit.

Preferably at least one of said first loading unit and second loading unit comprises: a carriage alternately movable away from and close to the cutting position, and carrying said guide; one-way locking members operating on the end stretch of the first continuous elongated element or on the end stretch of the second continuous elongated element for preventing sliding thereof relative to the guide away from the cutting position, without preventing sliding of the end stretch of the first continuous elongated element or of the end stretch of the second continuous elongated element respectively, relative to the guide towards the cutting position.

Said carriage is alternatively moveable between an advanced position at which an extremity of the end stretch of said first continuous elongated element or of the end stretch of said second continuous elongated element is positioned in the cutting position, and a backward-moved position at which said end is moved backward relative to the cutting position.

Said carriage is moveable upon command of a threaded rod operatively engaged by a nut screw drivable in rotation by a motor.

Said nut screw and said motor are operatively carried by a slide carrying said first loading unit and second loading unit.

Said one-way locking members comprise a pair of opposite rollers and at least one freewheel one-way clutch operatively coupled to at least one of said rollers.

Said one-way locking members comprise a selective locking member carried by the carriage and selectively actuatable for locking said end stretch of the first continuous elongated element or said end stretch of the second continuous elongated element relative to the guide, during the movement of the carriage towards the cutting position.

Said selective locking member is moveable towards the guide between a release condition in which it is spaced from the end stretch of the first continuous elongated element or from the end stretch of the second continuous elongated element and an operating condition in which it acts in thrust relation on said end stretch of the first continuous elongated element or on said end stretch of the second continuous elongated element respectively, to lock it against the guide.

Auxiliary locking devices selectively actuatable for locking an extremity of the end stretch of the first continuous elongated element or of the end stretch of the second continuous elongated element relative to the separation unit may be provided for.

Said auxiliary locking devices are selectively actuatable simultaneously with the movement of the carriage away from the cutting position.

Devices for supporting said first forming drum or a second forming drum rotatably around its concentric geometric axis with respect to said circumferential direction may be provided for.

Said deposition devices comprise a grip element moveable on the continuing of a direction of longitudinal extension of the end stretch of said first continuous elongated element or of the end stretch of said second continuous elongated element, between a grip position close to the cutting position and an extension position far from the cutting position.

Said deposition devices comprise application sliders symmetrically moveable along a moveable guide structure towards said geometric rotation axis.

Strip-like elements length setting devices for modifying the stroke carried out by the grip element in translating between the gripping position and the extension position may be provided.

Preferably a carriage carrying the end stretch of the first continuous elongated element or the end stretch of the second continuous elongated element is moveable according to a stroke of a smaller extent than a movement stroke of the grip element.

Deposition angle setting devices for adjusting the mutual orientation between a direction of longitudinal extension of the guide structure and a geometric rotation axis of the first forming drum or the second forming drum may be provided for.

Said deposition angle setting devices comprise a rotatable structure supporting the first forming drum or the second forming drum.

The deposition angle setting devices operate on the guide structure to modify the orientation thereof relative to said first forming drum or second forming drum.

Cutting angle setting devices, for adjusting the orientation of the separation unit relative to the longitudinal extension of the first continuous elongated element or of the second continuous elongated element may be provided for.

The cutting angle setting devices comprise a support structure carrying the separation unit angularly positionable around a pivoting axis.

According to a preferred embodiment the first forming drum and the second forming drum are the same forming drum.

BRIEF DESCRIPTION OF THE DRAWINGS

Further characteristics and advantages shall be more apparent from the detailed description of a preferred and non-exclusive embodiment of a process and a plant for building tyres, according to the present invention.

Such description is provided hereinafter with reference to the attached drawings, provided solely by way of a non-limiting example, wherein.

With reference to the aforementioned figures, a plant for building tyres for vehicle wheels, conceived to implement a process according to the present invention was indicated in its entirety with 1.

DETAILED DESCRIPTION OF THE INVENTION

Figure 4:
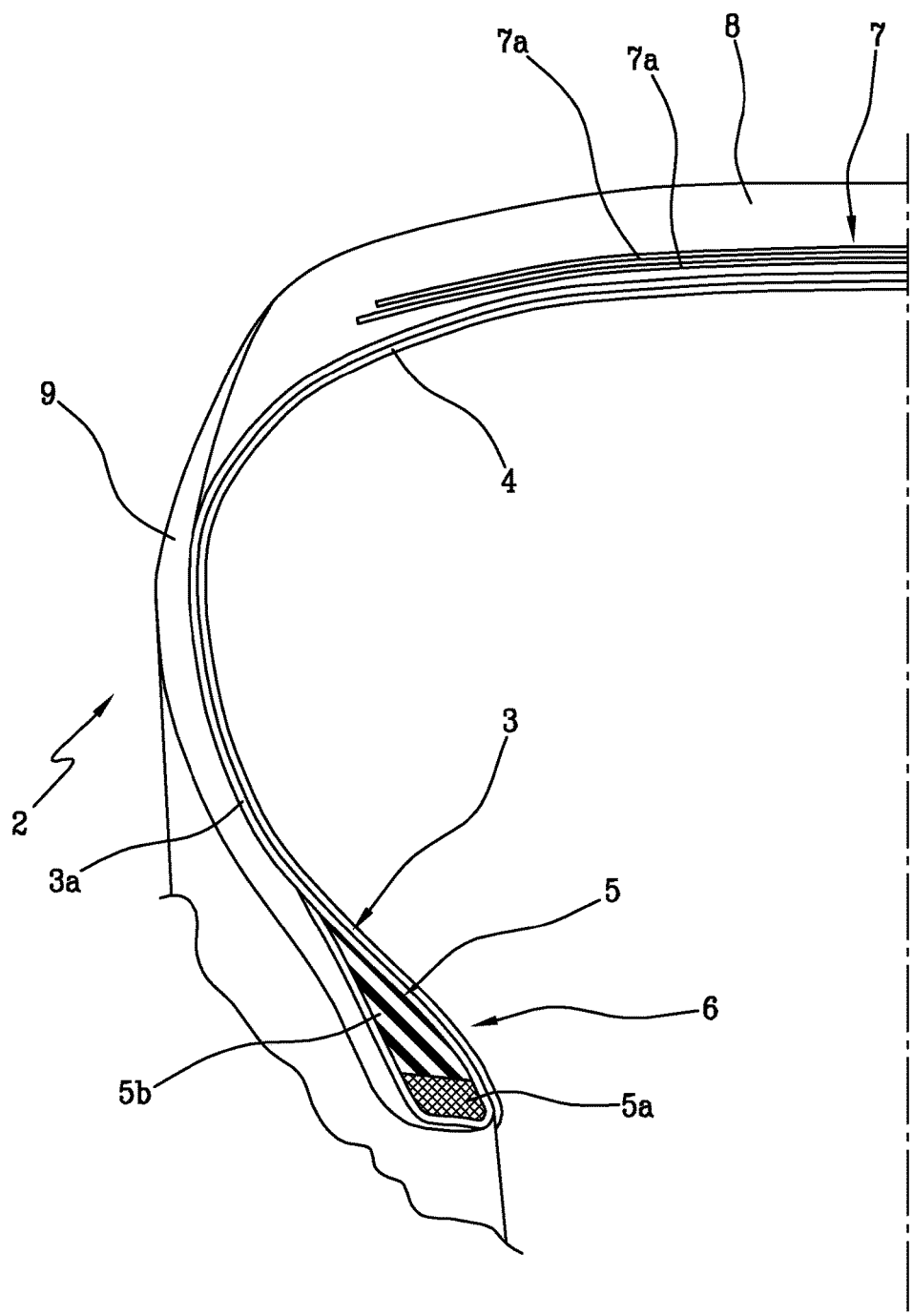
FIG. 4 schematically shows—by way of example—a tyre that can be obtained according to the present invention.

The plant 1 is conceived for the production of tyres 2 (FIG. 4) having a carcass structure 3 comprising at least one carcass ply 3a preferably internally covered by a layer of impermeable elastomeric material or so-called liner 4. Two annular anchoring structures 5, each comprising a so-called bead core 5a preferably carrying an elastomeric filler 5b at a radially outer position, are engaged to respective terminal zones of the carcass ply/plies 3a. The annular anchoring structures 5 are integrated in proximity of areas usually referred to by the name "beads" 6, at which there usually occurs the engagement between the tyre 2 with a respective mounting rim (not illustrated), according to a rim diameter defined by the inner diameter dimensions of the annular anchoring structure 5.

A crown structure 7 usually comprising one or more belt layers 7a is circumferentially applied around the carcass ply/plies 3a, and a tread band 8 is circumferentially superimposed on the belt layers 7a. Two sidewalls 9, each extending from the respective bead 6 to a respective side edge of the tread band 8, are applied in laterally opposite positions on the carcass ply/plies 3a.

Figure 1:
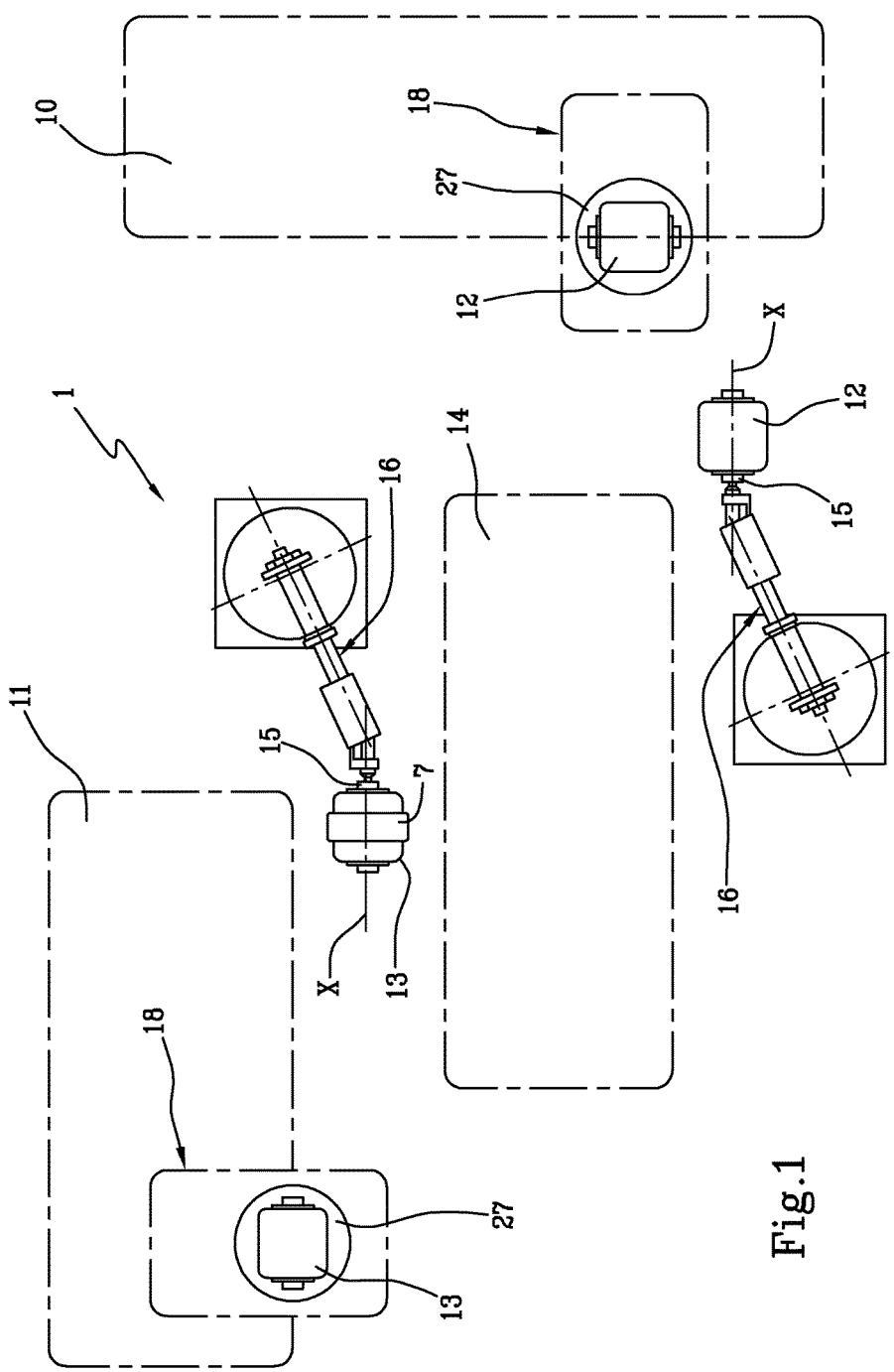
FIG. 1 schematically shows—in top view—a plant for the production of tyres according to the present invention.

In a preferred embodiment, schematically illustrated by way of example in FIG. 1, the apparatus 1 comprises a carcass-structure building line 10 and a crown-structure building line 11, in each of which at least one forming drum, preferably at least one first forming drum and at least one second forming drum, are sequentially moved between different work stations.

More in particular, carcass structure forming drums 12 are moved along the carcass-structure building line 10 while crown structure forming drums 13 are moved in the crown-structure building line 11.

In the carcass-structure building line 10, the work stations (not illustrated) are predisposed to form, on each carcass structure forming drum 12, a carcass structure 3 comprising said at least one carcass ply 3a, liner 4, annular anchoring structures 5 and possibly at least one part of the sidewalls 9.

Simultaneously, the work stations predisposed along the crown-structure building line 11 are suitable for forming, on each crown structure forming drum 13, the crown structure 7, comprising at least one belt structure 7a, the tread band 8, and possibly at least one part of the sidewalls 9.

Each forming drum may have a respective grip spigot 15 which can be operatively engaged by at least one robotized arm 16 and/or other transfer devices to be sequentially moved between the aforementioned work stations located along the carcass-structure building line 10 or, respectively, along the crown-structure building line 11.

The carcass structure forming drum's 12 may have constructive and functional characteristics different from those of the crown structure forming drum/s 13.

The apparatus 1 further comprises an assembling station 14, only schematically illustrated, at which each carcass structure 3 formed on the respective carcass structure forming drum 12 is coupled to one of the crown structures 7, before being removed from the respective crown structure forming drum 13.

At least one of the components of the carcass structure 3, for example said at least one carcass ply 3a, is obtained by depositing first strip-like elements 17a on the carcass structure forming drum 12; and/or at least one of the components of the crown structure 7, for example at least one of the belt layers 7a, is obtained by depositing second strip-like elements 17b on the respective crown structure forming drum 13.

In tyre building, the length of each strip-like element subtends the axial dimensions of the corresponding carcass ply 3a or belt structure 7a respectively. In tyre building each strip-like element has a width corresponding to a fraction of the circumferential extension of the tyre itself.

The provision and deposition of the first strip-like elements 17a, and the second strip-like elements 17b is preferably performed at at least one cutting and deposition station 18 provided along the carcass-structure building line 10 and/or along the crown-structure building line 11. Devices for feeding at least one first continuous elongated element 19 and at least one second continuous elongated element 20 operate in the cutting and deposition station 18.

The first continuous elongated element 19 and the second continuous elongated element 20 may advantageously be different from each other. For example, the elastomeric layer used in preparing the first continuous elongated element 19 may be manufactured using an elastomeric material different from that used in manufacturing the elastomeric layer of the second continuous elongated element 20. Additionally or alternatively, the reinforcing cords used in preparing the first continuous elongated element 19 may be different, for example depending on the structural characteristics and/or the number and geometric disposition of the same, from the reinforcing cords used for manufacturing the second continuous elongated element 20.

A separation unit 21 provides for selectively manufacturing first strip-like elements 17a and second strip-like elements 17b by respectively separating them from the first continuous elongated element 19 and from the second continuous elongated element 20, selected depending on the type of tyre intended to be manufactured. The separation unit 21 for example may comprise a shearing machine having a fixed cutter 21a cooperating in a predefined cutting position "T" with a moveable cutter 21b controlled by a cutting actuator 22, for example of the fluid dynamic type.

The separation unit 21 cooperates with deposition devices which provide for depositing the first strip-like elements 17a and the second strip-like elements 17b on the carcass structure forming drum 12 or on the crown structure forming drum 13. Such deposition devices may for example comprise at least one grip element 23 and an application unit 24.

The grip element 23 is moveable, for example along an auxiliary guide structure 23a, between a gripping position close (or proximal) to the cutting position "T", and an extension position far (or distal) from the cutting position "T". In the gripping position the grip element 23, for example provided gripper-like, is suitable to be activated mechanically, electromechanically or fluid mechanically, to grip a free end of an end stretch 19a of the first continuous elongated element 19, or an end stretch 20a of the second continuous elongated element 20, predisposed in the cutting position "T". In the extension position, the grip element 23 extends the first continuous elongated element 19 or the second continuous elongated element 20 beyond the cutting position "T" at a radially outer position with respect to the crown structure forming drum 13 (or to the carcass structure forming drum 12), supported in the cutting and deposition station 18 rotatably around a geometric rotation axis thereof X. When the grip element 23 reaches in proximity of the predefined extension position, the separation unit 21 is activated to cut the first continuous elongated element 19 or the second continuous elongated element 20 in the cutting position "T" and thus determine the separation of a first strip-like element 17a or a second strip-like element 17b, respectively, The application unit 24 may for example comprise application sliders 25, for example in form of pairs of rollers, which can be operatively engaged with the first continuous elongated element 19 or the second continuous elongated element 20 laid beyond the cutting position "T" and symmetrically moveable along a respective guide structure 24a. The guide structure 24a is moveable towards the geometric rotation axis X of the crown structure forming drum 13 (or the carcass structure forming drum 12), so as to radially approach—to the crown structure forming drum 13 (or to the carcass structure forming drum 12)—the first strip-like element 17a previously separated from the first continuous elongated element 19 or the second strip-like element 17b previously separated from the second continuous elongated element 20, to determine the deposition on an outer surface of the crown structure forming drum 13 (or the carcass structure forming drum 12) by the application sliders 25.

Once the deposition occurs the forming drum 13, of the crown structure (or the carcass structure forming drum 12), is rotated according to a predetermined angle around the geometric rotation axis X thereof, thus being ready to receive a strip-like element obtained as described above.

The aforementioned operating sequence leads to the deposition of a plurality of first strip-like elements 17a or second strip-like elements 17b, preferably distributed in a uniform manner over the whole circumferential extension of the respective forming drum, even more preferably disposed in a mutually approached relationship along a circumferential extension direction of the forming drum itself.

Strip-like elements length setting devices, comprising for example an end-stroke stop which can be positioned along the auxiliary guide structure 23a may be provided for. The length of the stroke carried out by the grip element 23 in translating between the gripping position and the extension position can thus be modified so as to be set according to a size to be selected from time to time as a function of the length of the strip-like elements to be obtained.

Deposition angle setting devices, suitable for adjusting the angular orientation of the direction of longitudinal extension of the guide structure 24a and/or of the auxiliary guide structure 23a, i.e. the translating direction of the application sliders 25 and/or of the grip element 23, relative to the geometric rotation axis X of each forming drum, to set it according to a value selected from time to time as a function of a desired deposition angle of the strip-like elements relative to the direction of circumferential extension of the forming drum itself may be provided for.

The deposition angle setting devices may comprise a rotatable structure 27 (FIG. 1), possibly represented by said robotized arm 16, supporting the carcass structure forming drum 12, and/or the crown structure forming drum 13. Additionally or alternatively, the deposition angle setting devices may operate directly on the guide structure 24a and/or on the auxiliary guide structure 23a, for modifying the orientation of the translating direction of the application sliders 25 and/or of the grip element 23 relative to each forming drum.

Cutting angle setting devices, predisposed for adjusting the orientation of the separation unit 21 relative to the longitudinal extension of the first continuous elongated element 19 or the second continuous elongated element 20, for setting it according to a value that can be selected from time to time, for example as a function of the desired deposition angle of the first strip-like elements 17a, or of the second strip-like elements 17b relative to the direction of circumferential extension of the carcass structure forming drum 12, or the crown structure forming drum 13 may be provided for.

The cutting angle setting devices may for example comprise a support structure 28 carrying the separation unit 21 which can be angularly positioned around a pivoting axis "Y".

In other words, the length and/or the cutting angle of the strip-like elements and/or the deposition angle thereof on the respective forming drum are suitable to be varied according to the needs, so as to build tyres with different characteristics from time to time, depending on the project specifications.

With the aim of allowing the production of tyres with characteristics different from time to time according to the project specifications, there is advantageously provided for the possibility of replacing the first continuous elongated element 19 and the second continuous elongated element 20, with respect to each other, with the aim of producing the first strip-like elements 17a and the second strip-like elements 17b, respectively.

Regarding this, a first loading unit 29 predisposed for positioning the first continuous elongated element 19 with the end stretch 19a thereof aligned with the cutting position "T", and a second loading unit 30 suitable for positioning the second continuous elongated element 20 with the end stretch 20a thereof adjacent, preferably parallel, to the end stretch 19a of the first continuous elongated element 19 are advantageously associated to the feeder devices of the first continuous elongated element 19 and the second continuous elongated element 20.

A selection unit 31 operates on the first loading unit 29 and on the second loading unit 30 for individually and selectively aligning the end stretch 19a of the first continuous elongated element 19, and the end stretch 20a of the second continuous elongated element 20 to the cutting position "T".

Preferably, the selection unit 31 comprises a slide 32 carrying the first loading unit 29 and the second loading unit 30. A selection actuator 33 carried by a fixed part 33a operates on the slide 32 to selectively position it between a first operating condition, in which the first loading unit 29 is operatively aligned with the cutting position "T", and a second operating condition in which the second loading unit 30 is operatively aligned with the cutting position "T".

Preferably, the slide 32 is slidably guided in a direction perpendicular to the longitudinal extension of the end stretch 19a of the first continuous elongated element 19, and the end stretch 20a of the second continuous elongated element 20 respectively carried by the first loading unit 29 and the second loading unit 30.

The slide 32 slides preferably parallel to a plane containing the end stretch 19a of the first continuous elongated element 19, and the end stretch 20a of the second continuous elongated element 20 or at least the directions of longitudinal extension of the same.

Each of said first loading unit 29 and second loading unit 30, or at least one of them, comprises a guide 34 slidably engaging the end stretch 19a of the first continuous elongated element 19 or, respectively, the end stretch 20a of the second continuous elongated element 20. The guide 34 is carried by a carriage 35 moveable away and approaching relative to the cutting position "T", preferably upon command of a threaded rod 36 operatively engaged by a nut screw 37 drivable in rotation by a motor 38. A toothed belt 39 or other transmission members operatively connect the nut screw 37 and the motor 38, operatively carried by the slide 32, to each other.

More in particular, the carriage 35 of each loading unit is alternatively moveable between an advanced (or proximal) position in which an end of the end stretch 19a of the first continuous elongated element 19, or the end stretch 20a of the second continuous elongated element 20, is positioned in the cutting position "T", and a backward-moved (or distal) position in which said end is moved backward relative to the cutting position "T".

One-way locking members 40, for example comprising a selective locking member 41 carried by the carriage 35 and selectively actuatable for locking said end stretch 19a of the first continuous elongated element 19, or said end stretch 20a of the second continuous elongated element 20 relative to the guide 34 during the movement of the carriage 35 towards the cutting position "T" are operatively connected to the carriage 35. The selective locking member 41 is moveable towards the guide 34, for example upon command of a fluid dynamic actuator 42 fixed to the guide 34 itself, between a release condition in which it is spaced from the end stretch 19*a* of the first continuous elongated element 19, or from the end stretch 20*a* of the second continuous elongated element 20 and an operating condition in which it acts in thrust relation on the same end stretch, to lock it against the guide 34.

Additionally or alternatively to the selective locking member 41, there may be provided at least one pair of opposite rollers 43, at at least one of which there is operatively coupled a freewheel one-way clutch.

The opposite rollers 43 operate on the end stretch 19*a* of the first continuous elongated element 19, or on the end stretch 20*a* of the second continuous elongated element 20, so as to avoid the unwanted sliding relative to the guide 34 away from the cutting position "T", in particular when the selective locking member 41 is in the release condition and/or during the movement of the carriage 35 towards the cutting position "T".

This allows eliminating the risk that the end stretch 19*a* of the first continuous elongated element 19, or the end stretch 20*a* of the second continuous elongated element 20 may move backward away from the cutting position "T", in particular if dragged by the same weight of the respective continuous elongated element disposed upstream. In addition the sliding of each end stretch relative to the guide 34 in the opposite direction, i.e., approaching the cutting position "T", is not hindered.

Additionally or alternatively to the one-way locking members 40 auxiliary locking devices 44 selectively actuatable, preferably simultaneously with the movement of the carriage 35 away from the cutting position "T", for locking an end of the end stretch 19*a* of the first continuous elongated element 19 or, respectively, the end stretch 20*a* of the second continuous elongated element 20 relative to the separation unit 21 may be provided for. Preferably, the auxiliary locking devices 44 comprise a pushing element 45 slidably engaged at the moveable cutter 21*b* of the separation unit 21 and actuatable hydraulically, for example countering the action of a spring 46, to push the end of the end stretch 19*a* of the first continuous elongated element 19, or the end stretch 20*a* of the second continuous elongated element 20, against the fixed cutter 21*a*.

Figure 2:
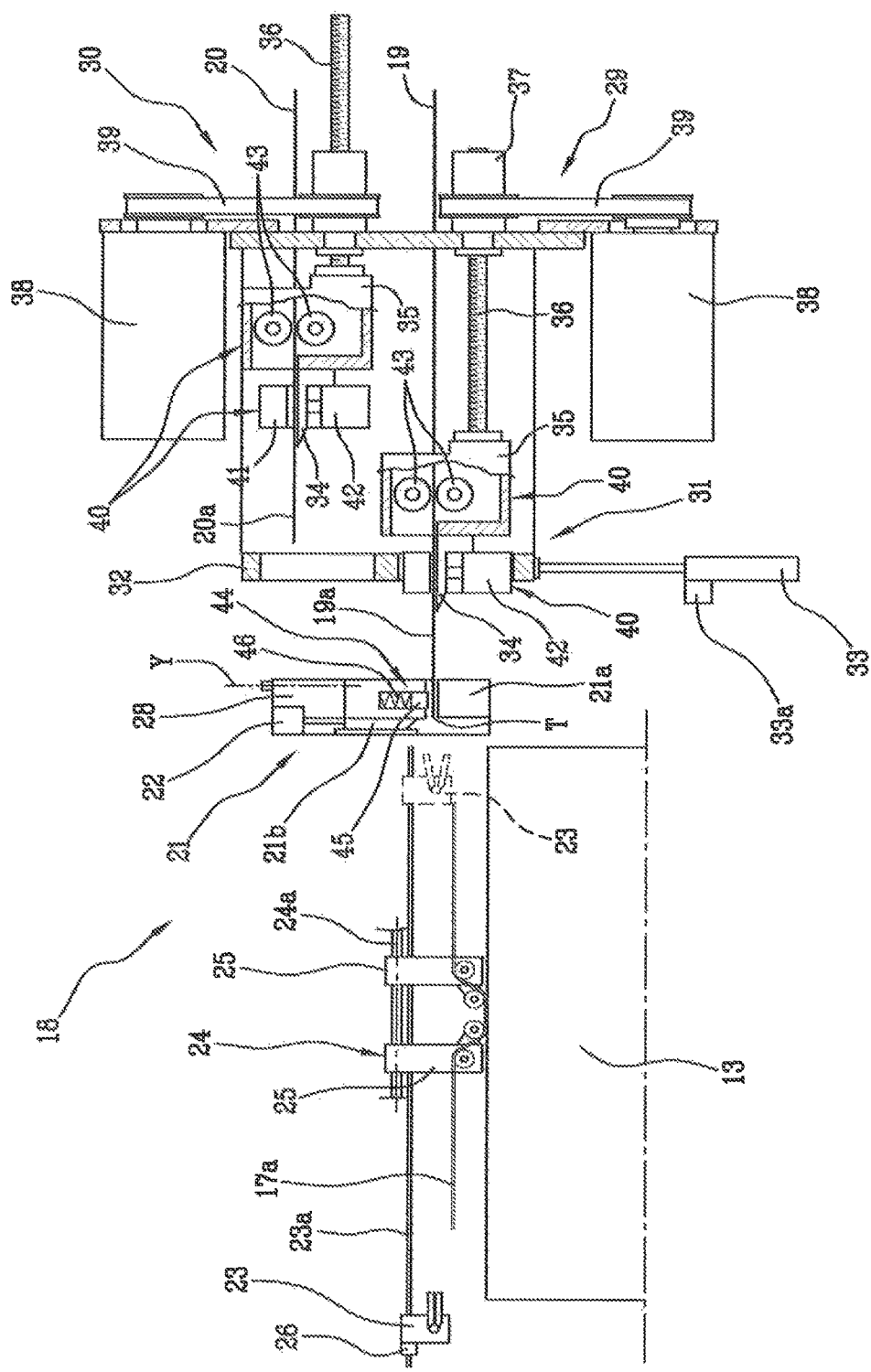
FIG. 2 schematically illustrates in lateral view and partial section the deposition of a first strip-like element on a forming drum.
Figure 3:
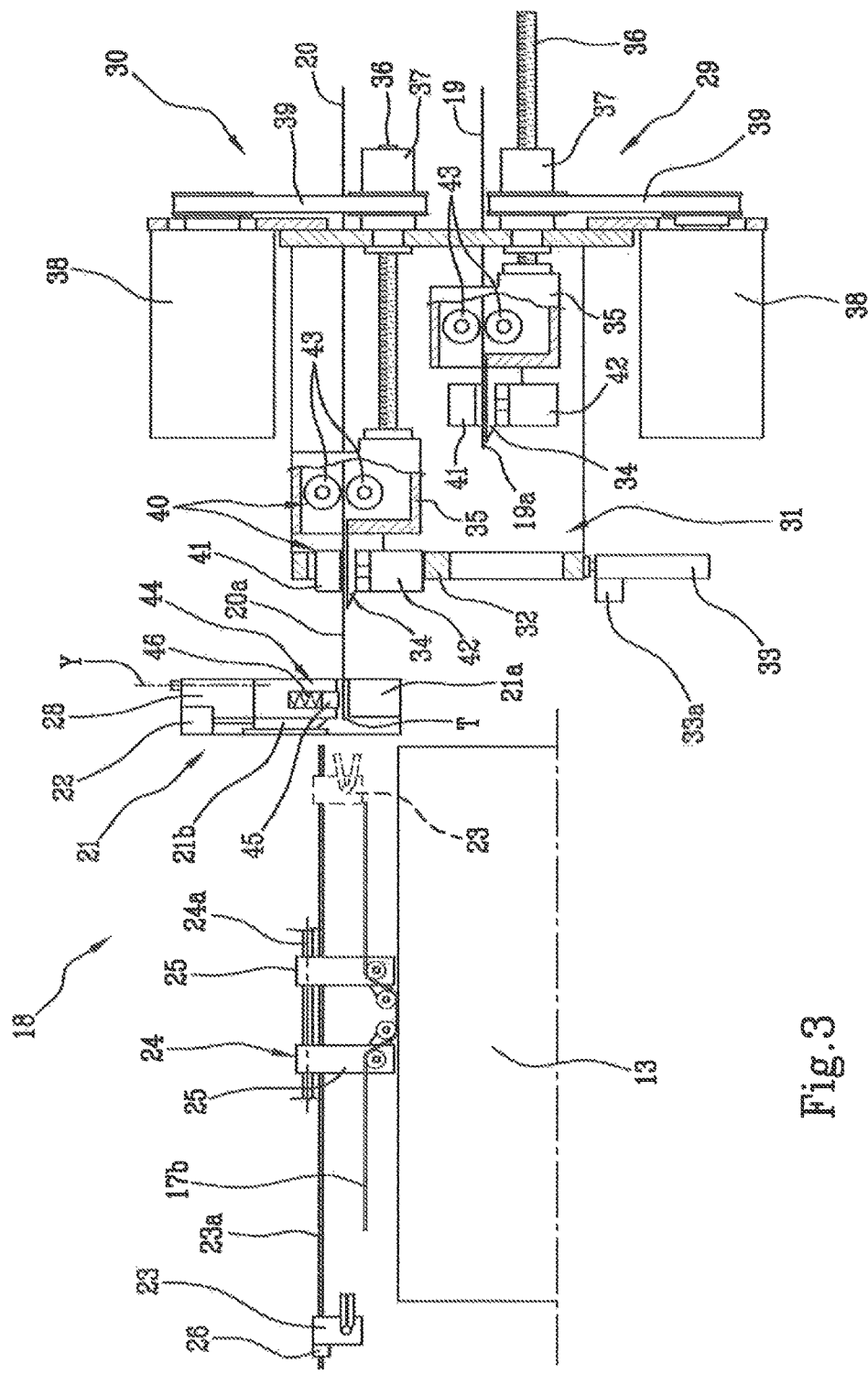
FIG. 3 schematically illustrates—in side view and partial section—the deposition of a second strip-like element on a forming drum.

The diagrams illustrated in FIGS. 2 and 3 illustrate the operating sequence according to which the replacement of the first continuous elongated element 19 and the second continuous elongated element 20 used in the production of the first strip-like elements 17*a*, and, respectively, the second strip-like elements 17*b* occurs.

FIG. 2 shows a situation in which the first continuous elongated element 19 is predisposed to be used for the production of the first strip-like elements 17*a*. The slide 32 is positioned in the first operating position, so that the end stretch 19*a* of the first continuous elongated element 19 is positioned with direction of longitudinal extension thereof aligned with the cutting position "T".

The end stretch 20*a* of the second continuous elongated element 20 is predisposed on the carriage 35 of the second loading unit 30, in an adjacent position relative to the end stretch 19*a* of the first continuous elongated element 19.

Upon the control of the respective motor 38, the carriage 35 of the first loading unit 29 is translated in the advanced position like in FIG. 2, so that the free end of the first continuous elongated element 19 is positioned in a grip position coincident or close to the cutting position "T".

In cases where the fixed and movable cutters 21*a*, 21*b* of the separation unit 21 are sufficiently spaced, the gripping position may coincide with the cutting position "T", given that the grip element 23 may be inserted therebetween to grip the free end of the first continuous elongated element 19 and laying the latter beyond the cutting position "T". This event for example may occur when the continuous elongated element 19 has longitudinal cords of the textile type, or which in any case do not require particularly high cutting efforts to separate the first strip-like elements 17*a*.

Should one, like in the illustrated example, prefer to avoid an insertion of the grip element 23 between the fixed and moveable cutters 21*a*, 21*b*, the free end of the first continuous elongated element 19 may be brought beyond the cutting position "T", by means of a pre-advancing action preferably performed cooperating with the auxiliary locking devices 44.

The pre-advancing action may be useful, for example, when using continuous elongated elements having metal cords, which require high cutting forces for separating the strip-like elements. The obtainment of high cutting forces may make it preferable to confer a relatively low stroke to the moveable cutter 21*b* of the separation unit 21, so as to hinder or prevent the insertion of the grip element 23 between the fixed cutter 21*a* and the moveable cutter 21*b*.

With the aim of performing the pre-advancing operation, the pushing element 45 of the auxiliary locking devices 44 is suitable to be actuated for pressing the free end of the first continuous elongated element 19 against the fixed cutter 21*a*, so as to lock the end stretch 19*a* relative to the separation unit 21 during a subsequent moving away of the carriage 35 from the cutting position "T". After activating the selective locking member 41 and deactivating the thrust action of the pushing element 45, a new movement of the carriage 35 towards the cutting position "T" is controlled, preferably according to a stroke of a lesser extent than a movement stroke of the grip element 23. This allows obtaining the desired pre-advancing of the free end of the first continuous elongated element 19 beyond the cutting position "T", up to a gripping position in which the end itself may be easily reached by the grip element 23 with the aim of extending the first continuous elongated element 19. A first strip-like element 17*a* may thus be separated from the first continuous elongated element 19 and applied on the carcass structure forming drum 12 or, as exemplified in FIGS. 2 and 3, on the belt structure forming drum 13. The pre-advancing action is repeated after the separation of each first strip-like element 17*a*, to predispose the free end of the first continuous elongated element 19 for the subsequent formation of a new first strip-like element 17*a*.

The aforementioned actions of laying, cutting, depositing and possible pre-advancing are repeated cyclically up to forming at least one component of a first tyre being processed, by means of a plurality of first strip-like elements 17*a* distributed circumferentially. Such component may for example comprise at least one belt structure 7*a* formed on a first crown structure forming drum 13 in the crown-structure building line 11, and/or at least one carcass ply 3*a* formed on a first carcass structure forming drum 12 in the carcass-structure building line 10.

When there is required the use of the second continuous elongated element 20 instead of the first continuous elongated element 19 (for example when one desires to build a carcass or crown structure using strip-like elements different from those used for the previous carcass structure or crown, or when one desires to build the same carcass or crown structure by means of carcass plies or belt layers obtained by means of different strip-like elements), the carriage 35 of the first loading unit 29 is returned in the backward-moved position, so that the end stretch 19a of the first continuous elongated element 19 is displaced longitudinally away from the cutting position "T". The selection actuator 33 thus translates the slide 32 from the first to the second operating condition, to align the second loading unit 30 with the cutting position "T", while the first loading unit 29 is displaced laterally. The end stretch 19a of the first continuous elongated element 19, and the end stretch 20a of the second continuous elongated element 20 are thus simultaneously translated in a transverse direction, more in particular perpendicularly, to the their longitudinal extension, up to aligning the end stretch 20a of the second continuous elongated element 20 to the cutting position "T".

A translation of the second loading unit 30 up to the respective advanced position determines the positioning of the free end of the second continuous elongated element 20 in the cutting position "T", like in FIG. 3. The second continuous elongated element 20 is thus predisposed to be used for the production of second strip-like elements 17b. The second strip-like elements 17b, for example used for manufacturing a second tyre, may be deposited, for example, on at least one second carcass structure forming drum 12, or on a second crown structure forming drum 13 like indicated in FIG. 3, engaged in the cutting and deposition station 18 replacing the first carcass structure forming drum 12 or, respectively, the first crown structure forming drum 13 previously used for processing the first tyre.

Alternatively, the second strip-like elements 17b may be deposited on the same first carcass structure forming drum 12, or first crown structure forming drum 13, for the production of at least one further component, for example a second carcass ply 3a or a second belt structure 7a of the aforementioned first tyre being processed.

The provision and deposition of the second strip-like elements 17b obtained from the second continuous elongated element 20 may be carried out in a manner analogous to that described with reference to the provision and deposition of the first strip-like elements 17a obtained from the first continuous elongated element 19.

It should be observed that the operations to be performed to replace the first continuous elongated element 19 and the second continuous elongated element 20 being processed are substantially limited to the backward movement of the carriage 35 carrying the continuous elongated element in use, translating the slide 32 and advancing in the carriage 35 carrying the other continuous elongated element to be used, followed by the possible pre-advancing action.

Such operations are suitable to be performed with extremely quick periods of time, in the order of a few seconds, simultaneously with the performance of other operations, such as for example the replacement of the forming drum in the cutting and deposition station and/or other operations for setting the station itself, so as not to delay the process further.

The invention claimed is:

1. A process for placing a first continuous elongated element and a second continuous elongated element in a carcass building line or in a crown building line for building a tyre comprising:
   manufacturing carcass structures;
   manufacturing crown structures; and
   assembling each carcass structure to one of said crown structures;
   wherein said manufacturing carcass structures or said manufacturing crown structures comprises
      positioning the first continuous elongated element within a cutting and deposition station in the carcass or crown building line to align an end stretch thereof with a cutting position, wherein a first forming drum is located within the cutting and deposition station;
      positioning the second continuous elongated element with an end stretch thereof in a side by side relationship with, and parallel to, the end stretch of the first continuous elongated element;
      forming, at a position radially external to the first forming drum, first strip-like elements from said first continuous elongated element;
      depositing said first strip-like elements on the first forming drum;
      linearly translating, while maintaining the side by side relationship between the end stretch of the first continuous elongated element and the second continuous elongated element, the end stretch of the first continuous elongated element and the end stretch of the second continuous elongated element in a direction perpendicular to a longitudinal extension of the end stretches; wherein translating is carried out simultaneously on the end stretch of the first continuous elongated element and on the end stretch of the second continuous elongated element to align the end stretch of the second continuous elongated element to said cutting position within the cutting and deposition station;
      forming, at a position radially external to a second forming drum located within the cutting and deposition station, second strip-like elements from said second continuous elongated element; and
      depositing said second strip-like elements on the second forming drum, said second forming drum not coinciding with said first forming drum;
   wherein forming one of the first strip-like elements comprises:
      longitudinally pre-advancing a first free end, which is a free end of the end stretch of the first continuous elongated element, beyond the cutting position by an extent less than a length of the one of the first strip-like elements, to bring the free end to a grip position radially external to the first forming drum;
      gripping the first free end of the end stretch of the first continuous elongated element pre-advanced beyond the cutting position;
      laying the first continuous elongated element by an extent equal to the length of the one first strip-like element beyond the cutting position, at a radially external position relative to the first forming drum; and
      cutting the first continuous elongated element in the cutting position;
   wherein forming one of the second strip-like elements comprises:
      moving the first free end backward from the cutting position by moving a first carriage backward from a separation unit comprising a cutter and lock for the continuous elongated elements; then performing the step of linearly translating; then moving a second carriage towards the separation unit until a second free end, which is a free end of the end stretch of the second continuous elongated element, is stopped at the cutting position; then longitudinally pre-advancing the second free end beyond the cutting position by an extent less than a length of the one of the second strip-like elements by: locking the end stretch of the second continuous elongated element relative to the separation unit and then moving the second carriage away from the cutting unit while the second carriage slidably engages the end stretch of the second continuous elongated element, then unlocking the end stretch of the second continuous elongated element relative to the separation unit and locking the end stretch of the second continuous elongated element relative to the second carriage, then moving the second carriage close to the cutting position so as to bring the second free end beyond the cutting position, to bring the second free end to a grip position radially external to the second forming drum;

gripping the second free end of the end stretch of the second continuous elongated element pre-advanced beyond the cutting position;

laying the second continuous elongated element by an extent equal to the length of the one second strip-like element beyond the cutting position, at a radially external position relative to the second forming drum; and cutting the second continuous elongated element in the cutting position.

2. The process as claimed in claim 1, wherein said first strip-like elements are distributed in a side-by-side arrangement along a circumferential direction of said first forming drum, and said second strip-like elements are distributed in a side-by-side arrangement along a circumferential direction of said second forming drum.

3. The process as claimed in claim 1, wherein a first tyre being processed on said first forming drum is partly formed during said depositing said first strip-like elements, and a second tyre being processed on said second forming drum is partly formed during said depositing said second strip-like elements.

4. The process as claimed in claim 1, wherein depositing each first strip-like element or second strip-like element is followed by a rotation of the first forming drum or of the second forming drum respectively, according to a predetermined angle around a rotation axis thereof.

5. The process as claimed in claim 1, further comprising adjusting an orientation of a cutting angle according to which cutting said first continuous elongated element or said second continuous elongated element is carried out.

6. The process as claimed in claim 1, wherein depositing each of said first strip-like elements and second strip-like elements is carried out by radially approaching said first strip-like elements and said second strip-like elements relative to said first forming drum or said second forming drum.

7. The process as claimed in claim 1, wherein, in depositing said first strip-like elements and said second strip-like elements, said first strip-like elements and second strip-like elements are distributed in a uniform manner over a whole circumferential extension of the first forming drum or the second forming drum.

8. The process as claimed in claim 1, further comprising setting a deposition angle of the first strip-like elements and of the second strip-like elements according to a desired value, relative to a circumferential extension direction of the first forming drum or the second forming drum.

9. The process as claimed in claim 8, wherein the step of setting of the deposition angle comprises modifying an orientation of a rotation axis of the first forming drum or the second forming drum, respectively.

10. The process as claimed in claim 1, wherein, in preparing the first continuous elongated element, reinforcing cords are used that are of a differing type from reinforcing cords used for manufacturing the second continuous elongated element.

11. The process as claimed in claim 1, wherein an elastomeric layer used in preparing the first continuous elongated element is manufactured using an elastomeric material of a differing type from an elastomeric material used for manufacturing a corresponding elastomeric layer used in preparing the second continuous elongated element.

* * * * *